United States Patent [19]
Wightman, Jr.

[11] 4,392,307
[45] Jul. 12, 1983

[54] ADJUSTABLE FACE-PLATE TEMPLATE

[76] Inventor: William Wightman, Jr., 1034 Rimpau Ave., Corona, Calif. 91720

[21] Appl. No.: 327,363

[22] Filed: Dec. 4, 1981

[51] Int. Cl.³ ............................................. B27G 17/08
[52] U.S. Cl. ....................................................... 33/197
[58] Field of Search ............................ 33/197, 174 G; 144/144.5 GT, 144.5 R, 144 R

[56] References Cited
U.S. PATENT DOCUMENTS 1,679,074  7/1928  Carter ................................ 33/197 X
1,954,368  4/1934  Sacrey .................................. 33/197

Primary Examiner—Harry N. Haroian
Attorney, Agent, or Firm—Francis X. LoJacono

[57] ABSTRACT

An adjustable face-plate template adapted to be adjustably fitted and clamped to the longitudinal edge of a door to establish a predetermined-size recess for a face plate of a door latch or lock, wherein the template includes a first, adjustable, parallelogram structure defining a clamping device having a pair of clamping bars, and a second parallelogram structure defined by a pair of guide bars arranged to determine the width of the recess to be cut. Slidably mounted to one of the clamping bars is a pair of transverse guide bars adapted to be adjusted to establish the length of the recess to be cut. Both parallelogram structures are pivotally connected together.

7 Claims, 4 Drawing Figures

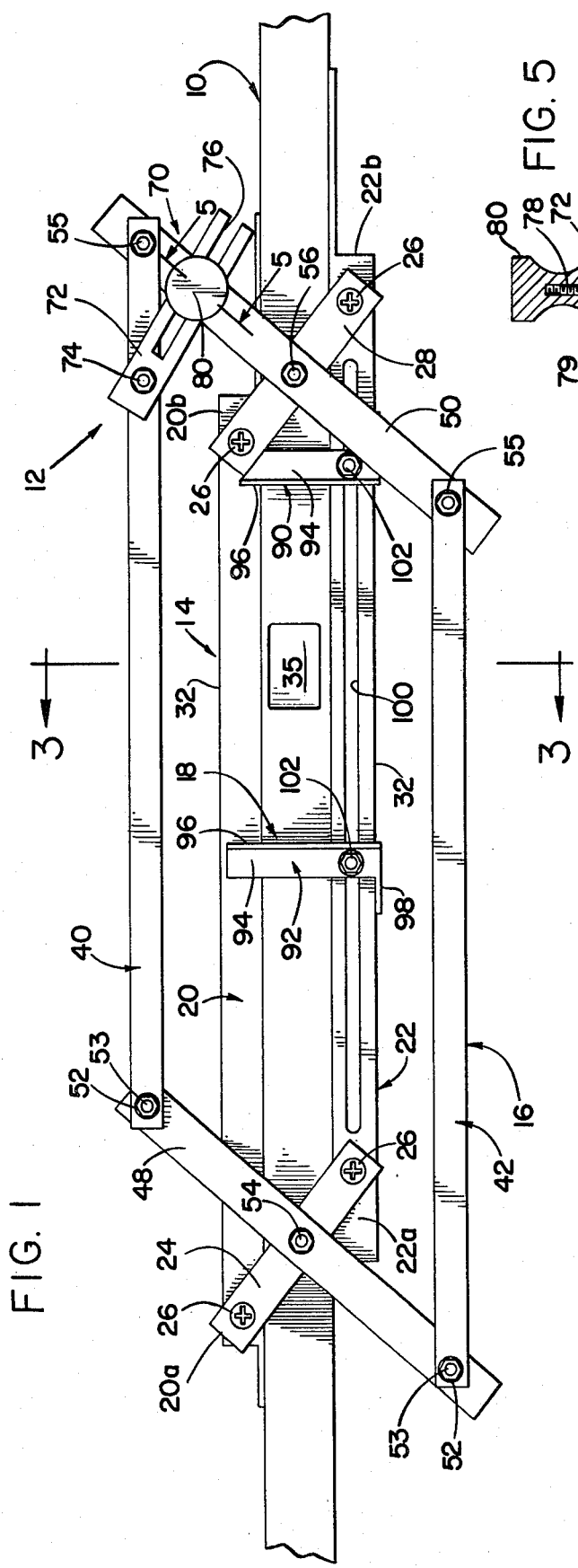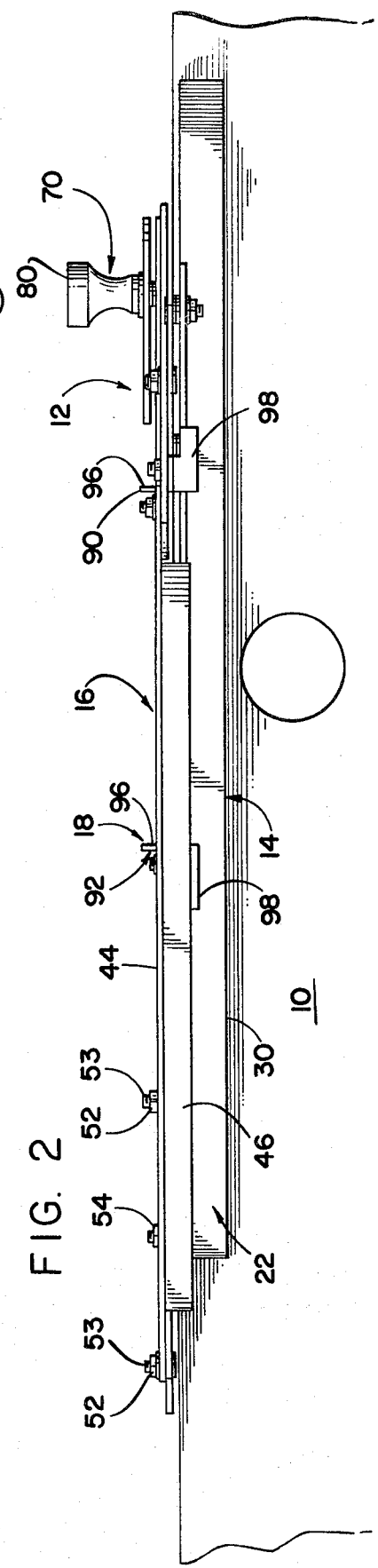

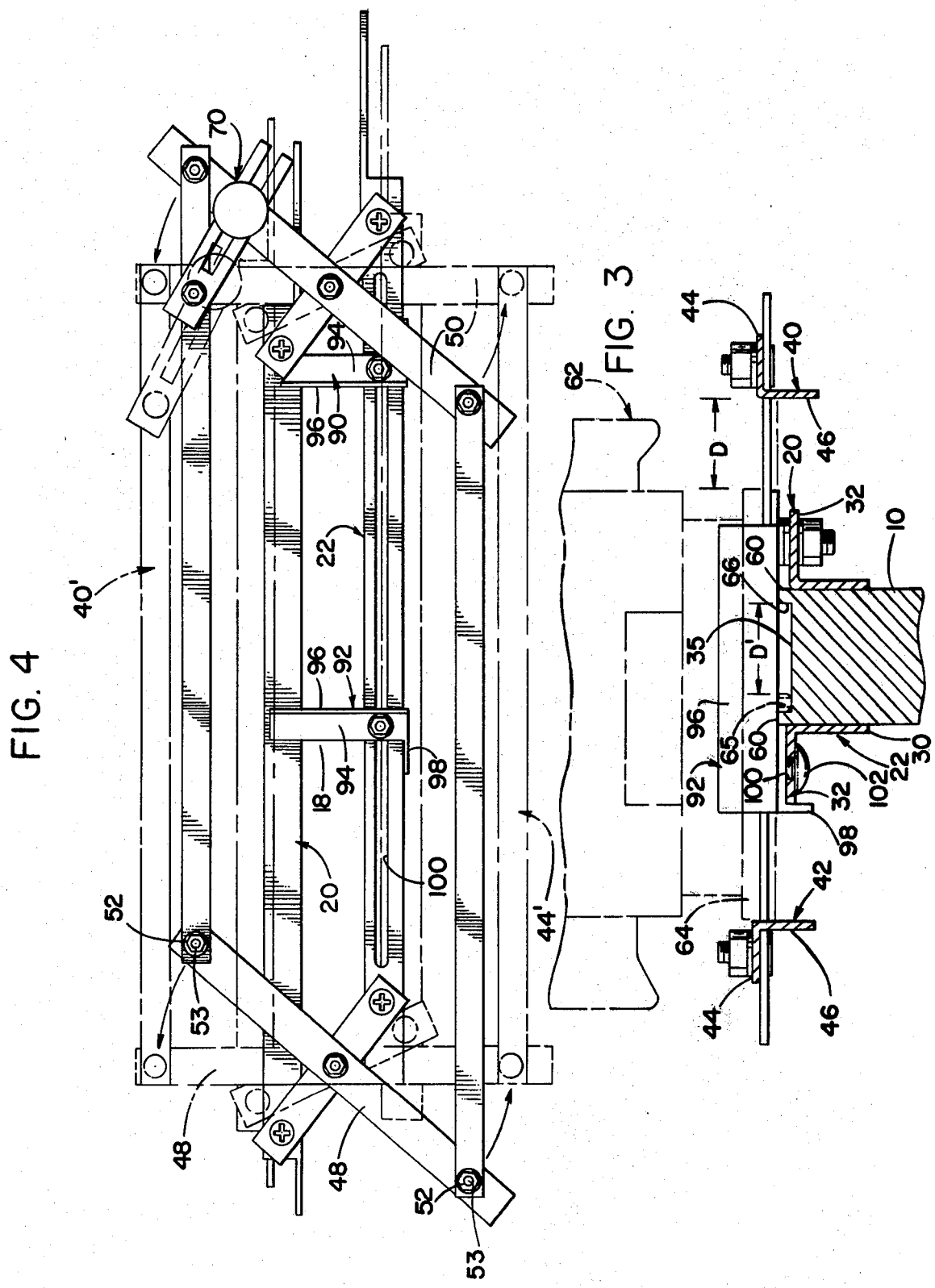

ADJUSTABLE FACE-PLATE TEMPLATE

BACKGROUND OF THE INVENTION

1. Field of the Invention

This invention relates to generally to a face-plate template, and more particularly to an adjustable face-plate template that includes a first and a second parallelogram structure having a simple locking device.

2. Description of the Prior Art

It is well known in the art that various problems and difficulties are being encountered in providing suitable means for cutting a face-plate recess in the longitudinal side wall of a door, so that it is in perfect alignment with the adjacent transverse hole provided for the door-lock assembly. The recess is generally rectangular in configuration, and must not only align with the adjacent hole provided for the door lock but also have the correct depth of cut so as to correspond to the thickness of the plate, as well as to the length and width.

Several types of templates for this purpose have been and are still being employed. However, these devices often have features that restrict their use with respect to certain types of doors. Also, these devices are complicated to operate, the alignment of the template itself being time-consuming because of the many adjustments required.

SUMMARY OF THE INVENTION

The present invention has for an important object to overcome the above-noted difficulties, and to provide an adjustment face-plate template of simple construction comprising a pair of intereconnected parallelogram structures that, when adjusted to establish a particular face-plate recess, can be locked into position by a locking device.

It is another object of the invention to provide an adjustable face-plate template that includes an adjustable clamping structure, defining one of the parallelogram structures, having a pair of parallel clamping bars arranged to engage the opposing front and rear surfaces of the door, regardless of the thickness of the door; and wherein the second parallelogram structure is operably attached to the first structure, but independently adjustable thereto to establish the width of the face-plate recess.

Still another object of the invention is to provide a device of this character that is readily adapted to operate in combination with most compatible rotor tools—those having the flanged base of the rotor operably secured between the prelocated side-guide members and the transverse guide members, by which the width and the length are respectively formed.

It is still another object of the present invention to provide a device of this character that is easily adjustable and has relatively few operating parts.

It is still a further object of the invention to provide a device of this character that is easy to service and maintain, and is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a top-plan view of the present invention shown mounted to a door in the typical manner;

FIG. 2 is a side-elevational view thereof, showing the relationship of the device to the door-lock hole;

FIG. 3 is an enlarged transverse cross-sectional view taken substantially along line 3—3 of FIG. 1, showing a rotor tool mounted thereon and the rotor blade cutting the face-plate recess;

FIG. 4 is a top-plan view, showing the device in two different positions, one position being indicated in phantom lines; and FIG. 5 is a cross-sectional view taken substantially along line 5—5 of FIG. 1.

DESCRIPTION OF THE PREFERRED EMBODIMENT

Referring more particularly to FIG. 1, there is illustrated a suitable door 10 on which is mounted the present invention, an adjustable face-plate-template device, generally designated at 12. The template device 12 comprises a first adjustable parallelogram structure defining a clampaing means, indicated generally at 14, and a second adjustable parallelogram structure defining a transverse guide means, generally indicated at 16, wherein a longitudinal guide means is provided, indicated generally at 18.

Clamping means 14 are formed having a pair of oppositely disposed clamping bars 20 and 22. These clamping bars are interconnected at the terminating ends—that is, end 20a of clamping bar 20 is connected to end 22a of bar 22 by link member 24. Each end of link 24 is pivotally attached to a respective clamping bars 20 and 22 by pivot means indicated by screws 26. The opposite ends 20b and 22b of respective clamping bars 20 and 22 are interconnected by a link member 28, which is also pivotally attached to the ends thereof by screws 26. Bars 20 and 22 are formed from an angle member, preferably of aluminum, having a depending flange member 30 and a horizontal flange member 32. Accordingly, depending flange 30 is adapted to engage against the front and rear surfaces of door 10 in a clamping manner. A suitable type of securing means, such as a vise clip or "C" clamp (not shown) is used to secure bars 20 and 22 to the door, so as to prevent longitudinal movement of the device along the door edge. The two opposing clamping bars are held in parallel relationship to each other by means of the connecting-link members 24 and 28, but are allowed to be moved inwardly and outwardly of each other, as indicated in FIG. 4 wherein the full lines show the clamping bars in their closest relationship to each other—the phantom lines of the clamping bars showing them spread apart for doors having greater thicknesses. Hence, it should be noted that link members 24 and 28 are also held in parallel relationship to each other, when clamping bars 20 and 22 are moved.

The second parallelogram structure 16 provides a means to fix the desired width of the face-plate recess, indicated at 35 in FIGS. 1 and 3, by means of a pair of parallel guide members or bars 40 and 42, each bar being formed from an angle member having a horizontal flange 44 and a depending flange 46. The guide bars 40 and 42 are adapted to be adjustable, so that they can be moved inwardly to establish a narrow width for recess 35 or moved outwardly to provide a greater width for recess 35, the bars being held to a parallel equidistant movement relative to each other, as seen in FIG. 4. To accomplish this action, the ends of the respective guide bars 40 and 42 are pivotally interconnected by guide-link members 48 and 50. Link member 48 is pivotally connected to respective guide bars 40 and 42 by suitable means such as nuts and bolts 52 and 53. In addition, guide-link member 48 is pivotally secured to clamping-link member 24 by a pivot means, shown as a nut and bolt 54. Guide-link member 50 is also pivotally connected to guide bars 40 and 42 at their opposite ends by suitable pivot means, indicated at 55, and pivotally secured to clamping-link member 28. The pivotal-securing means 56, like 54, is positioned intermediate the ends of guide-link member 50 and intermediate the ends of clamping-link member 28. Such a combined pivotal arrangement allows both parallelogram structures to move independently of each other, but at the same time provides a constant parallel relationship between the respective bars 20, 22, 40 and 42.

It should be noted that clamping bars 20 and 22 are positioned below guide bars 40 and 42, as illustrated in the cross-section of FIG. 3. This arrangement allows clamping bars 20 and 22 to be located below the side edges 60 of the door, so as not to interfere with the positioning and movement of the rotor, generally indicated at 62. The rotor 62 includes the well-known annular base 64 and a centrally disposed cutting bit 65. Thus, guide bars 40 and 42 must be positioned so that the annular base 64 of rotor 62 engages the depending flange members 46 of the respective guide bars. Lateral movement of the rotor 62 between guide bars 40 and 42 will form the width of recess 35. The distance D (shown in FIG. 3) between the edge of base 64 and depending flange 46 must equal D', the distance between the inner side 66 of recess 35 and the cutting surface of bit 65. Hence, the dimension of D is determined by the required width of recess 35, less the diameter of the cutting bit 64. As an example, if the width of recess 35 were to be one inch and a quarter-inch bit is used, the distance D should equal three-quarters of an inch.

Once the clamping bars are in their proper position and the guide bars are set, a locking means (indicated at 70) is secured, whereby structure 16 is locked into place. The locking means comprises a bifurcated or slotted lock arm 72 pivotally attached at 74, by suitable means, to guide bar 40. Lock arm 72 is provided with a slot 76 which is adapted to receive threaded lug 68, the lug being mounted to guide-link member 50 between pivots 55 and 56. A locking knob 80 is adapted to receive threaded lug 78, so that when knob 80 is tightened on lug 78 lock arm 72 is clamped against spacer 79, the spacer being interposed between link 50 and arm 72. When knob 80 is released, arm 72 is allowed to rotate about pivot 75 in order to assume any angle relative to the positions of bar 40 and link 50.

Since clamping link 28 is pivotally connected to guide link 50, the guide bars 40 and 42 are held in place by the one locking means 70. FIG. 4 illustrates two positions of the clamping and guide structures. Note that guide bars 40' and 42' are shown at their widest position, and the guide links 48' and 50' are in a substantially perpendicular position.

The longitudinal guide means designated at 18 defines the length to which recess 35 is to be formed. The guide means 18 comprises a pair of transverse short guide arms 90 and 92 which are slidably adjustable along clamping bars 20 and 22, whereby each guide arm can be positioned to establish the longitudinal movement of the rotor 62. FIG. 1 shows the location of the guide arms with respect to recess 35. Each arm is formed having a flat bottom flange 94, and a perpendicular flange 96 adapted to be positioned above and across the width of the door 10, whereby upright flange members 96 are arranged to be engaged by the base 64 of the rotor. Thus, the distance between the arms will determine the length of the recess 38, the distance being calculated in the same manner as heretofore described for the width.

In order to secure each arm 90 and 92 in a position normal to the clamping bars, there is provided a shoulder plate 98 integrally formed on the arm members that engages the leading edge of guide bar 22. Further included therein is a means to adjust arms 90 and 92 longitudinally along the guide bars, the adjusting means comprising an elongated slot 100 formed in the horizontal flange 32, and a nut and bolt 102 that passes through slot 100, so as to secure each arm tightly against guide bar 22.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. An adjustable face-plate template for forming a recess in a door to receive a door-lock face-plate, the template comprising:
   a clamping means defined by a first parallelogram structure adapted to be clamped to the longitudinal edge of a door;
   a first guide means defined by a second parallelogram structure, said second parallelogram structure being operably connected to said first parallelogram structure, each structure thereof being independently adjustable relative to the other;
   a second guide means adjustably mounted to said clamping means; and
   locking means attached to said first guide means to secure said second parallelogram structure in its respective position relative to the forming of a specific recess configuration.

2. An adjustable face-plate template as recited in claim 1, wherein said first parallelogram structure comprises:
   a pair of oppositely disposed clamping bars;
   a pair of link members pivotally attached adjacent the ends of said opposing clamping bars; and
   means for pivotally interconnecting said clamping bars with said link members.

3. A face-plate template as recited in claim 2, wherein said second parallelogram structure comprises:
   a pair of oppositely disposed guide bars having a parallel relationship with said clamping bars, and adapted to determine the width of said recess;
   a pair of guide-link members pivotally attached adjacent the ends of said opposing guide bars; and
   means for pivotally interconnecting said guide bars and said guide-link members, to allow said guide bars to be adjustably spaced from each other longitudinally along each side of said door.

4. A face-plate template as recited in claim 3, wherein said second guide means comprises:
   a pair of guide arms attached to at least one clamping bar and positioned transversely across the edge of said door, and adapted to determine the length of said recess; and
   means thereon to adjustably position said guide arms along said clamping bar in a predetermined spaced relationship to each other.

5. A face-place template as recited in claim 4, wherein said locking means comprises:
   a slotted locking arm pivotally attached to one of said guide bars;
   a locking knob adjustably attached to one of said guide-link members and adapted to engage said slotted locking arm in a locking position, whereby said second parallelogram structure is locked in a set position relative to said door.

6. A face-plate template as recited in claim 5, wherein said adjustable means for said guide arms comprises:
   an elongated slot formed in one of said clamping bars; and
   a fastening means disposed within said slot and said guide arms.

7. A face-plate template as recited in claim 6, wherein said clamping bars are formed having a depending flange member and a horizontal flange member, said depending flange member being adapted to engage and clamp to said door, and said horizontal flange member being adapted to be positioned below the edge of said door; and wherein said guide bars are formed having a horizontal flange member and a depending flange member, the horizontal flange member of said guide bar being positioned above said horizontal flange member of said clamping bar.

* * * * *